United States Patent [19]

Tanaka et al.

[11] 4,418,348

[45] Nov. 29, 1983

[54] ROTATION POSITION DETECTOR USING STATIONARY AND ROTATABLE DISK PLATES

[75] Inventors: Hiroaki Tanaka; Sigeyuki Akita, both of Okazaki, Japan

[73] Assignee: Nippon Soken, Inc., Nishio, Japan

[21] Appl. No.: 343,015

[22] Filed: Jan. 26, 1982

Related U.S. Application Data

[63] Continuation of Ser. No. 105,118, Dec. 19, 1979, abandoned.

[30] Foreign Application Priority Data

Dec. 27, 1978 [JP] Japan .................................. 53-162707

[51] Int. Cl.³ .............................................. G08C 19/10
[52] U.S. Cl. ............................. 340/870.37; 324/61 R; 340/347 P
[58] Field of Search ................... 340/870.37, 347 P; 318/662; 324/61 R

[56] References Cited

U.S. PATENT DOCUMENTS

| | | | |
|---|---|---|---|
| 3,222,668 | 12/1965 | Lippel | 340/347 P |
| 3,355,806 | 12/1967 | Brook | 340/870.37 |
| 3,702,467 | 11/1972 | Melnyk | 340/870.37 |
| 3,760,392 | 9/1973 | Stich | 340/870.37 |
| 3,938,113 | 2/1976 | Dobson et al. | 340/870.37 |
| 3,961,318 | 6/1976 | Farrand et al. | 340/870.37 |
| 4,092,579 | 5/1978 | Weit | 340/870.37 |

*Primary Examiner*—James J. Groody
*Attorney, Agent, or Firm*—Cushman, Darby & Cushman

[57] ABSTRACT

A rotation detection apparatus has a first input side disk plate having first and second circumferentially arranged electrodes. An output side second disk plate has electrodes arranged in a circumferential direction to oppose the first plate. One of the disk plates is stationary and one is rotatable. A circuit is provided for supplying a periodic signal of a predetermined period to the first and second electrodes of the first plate. A rotation signal generating circuit is provided for detecting a phase condition between the signal at the electrodes of the second plate and the signal from the periodic signal supplying circuit and generating a rotation signal. A signal transmission device is also provided for transmitting a signal between the rotating plate and the stationary plate.

2 Claims, 22 Drawing Figures

FIG.IA
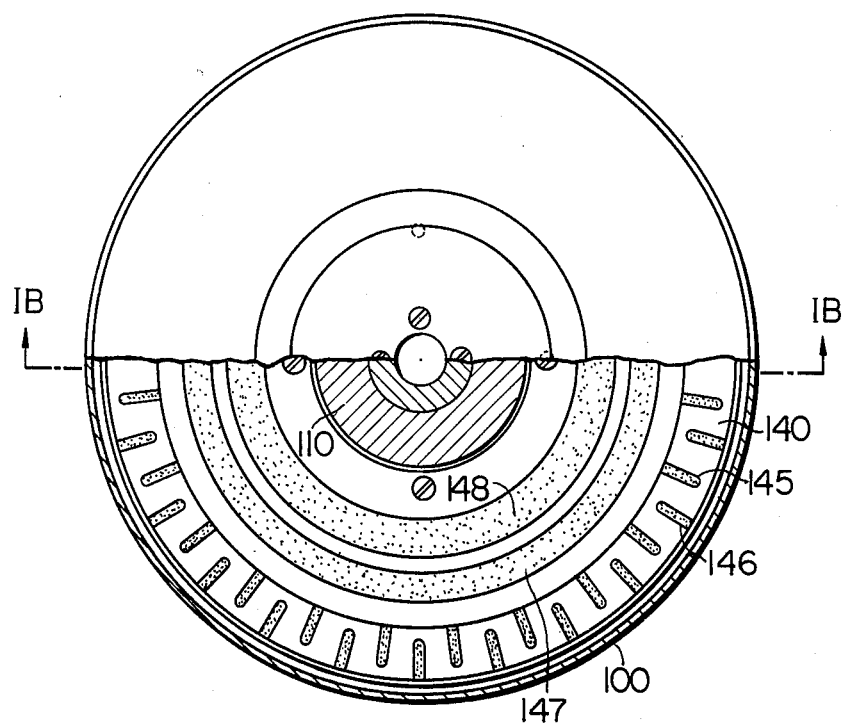
FIG.IB
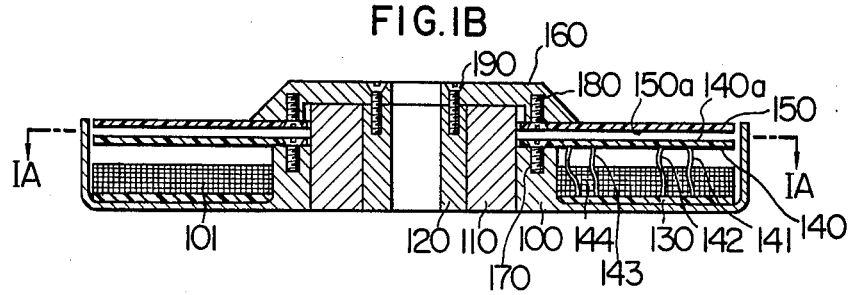
FIG.4A
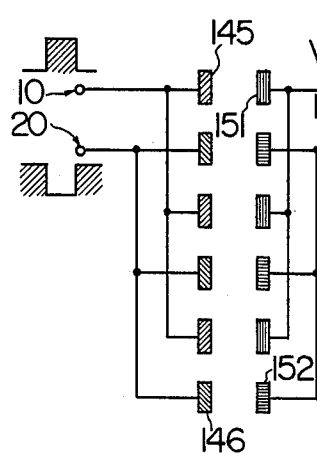
FIG.4B
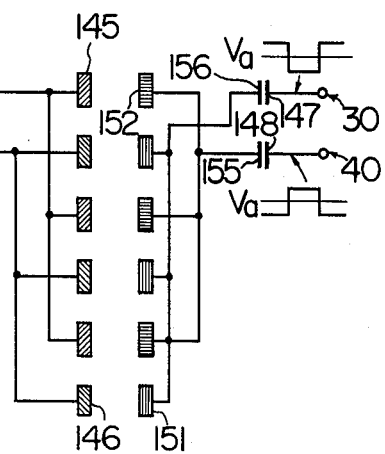

FIG.8
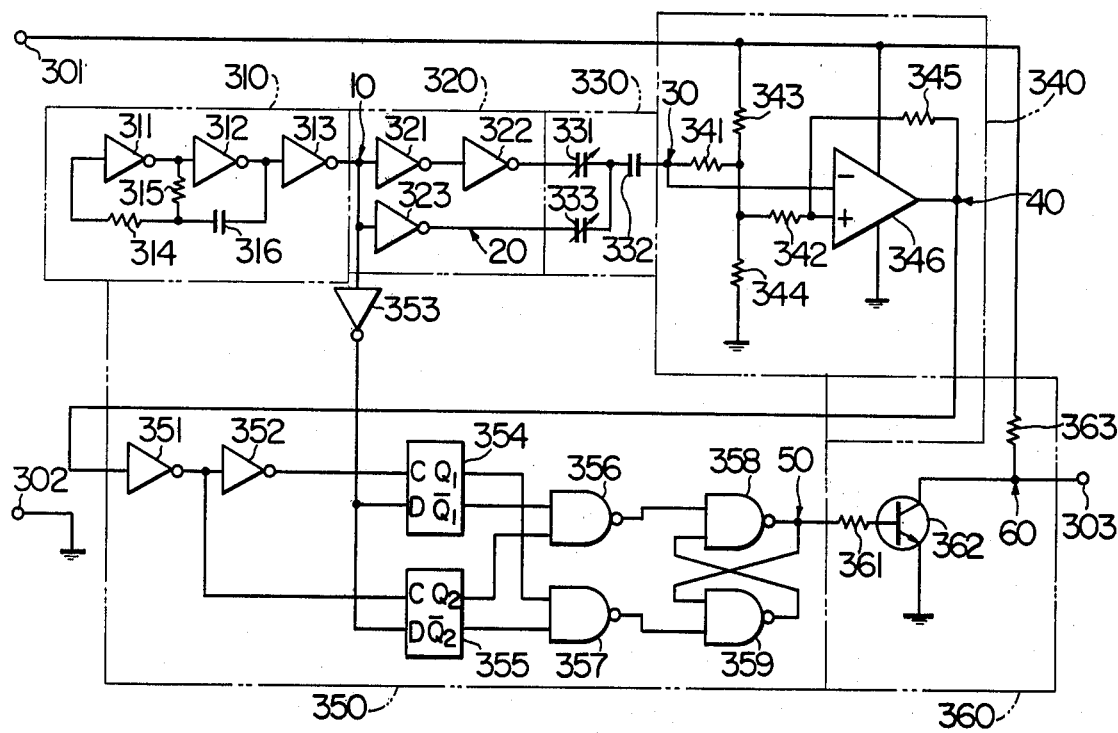
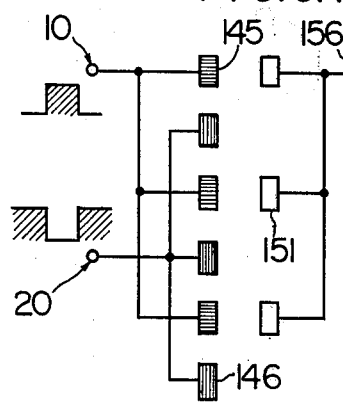
FIG.9A
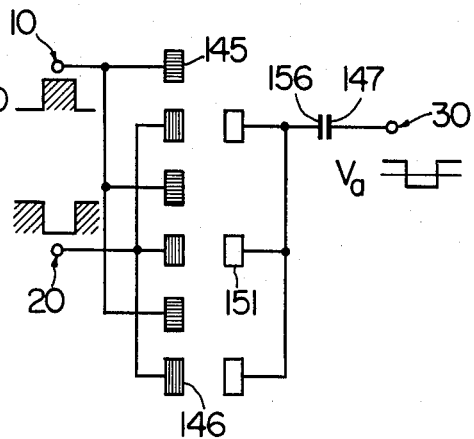
FIG.9B

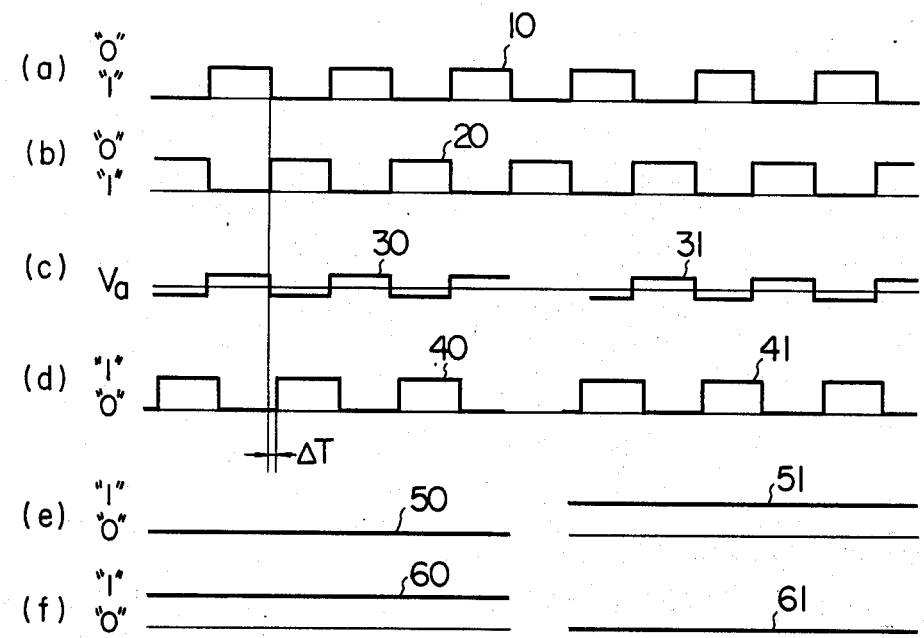
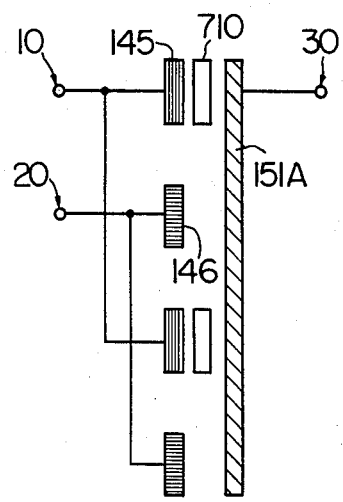 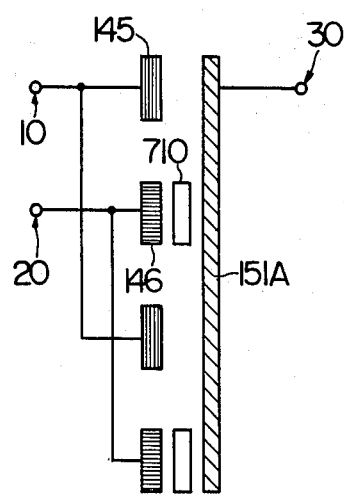

ROTATION POSITION DETECTOR USING STATIONARY AND ROTATABLE DISK PLATES

This is a continuation of application Ser. No. 105,118 filed Dec. 19, 1972, now abandoned.

BACKGROUND OF THE INVENTION

The present invention relates to an apparatus for detecting the rotation position of a crankshaft of an engine in an automobile or the like, and particularly to an apparatus capable of detecting instantly the rotation position of a rotating body such as a crankshaft under any rotation speed.

There has been proposed apparatus for detecting the revolution of the crankshaft of the engine in automobile, or the like in which a magnetic substance with a coil thereon is used to oppose the rotating body so that an alternating electromotive force can be induced in the coil by the change of magnetic flux due to the unevenness or projections of the rotating body, thereby detecting the revolution of the rotating body.

In this kind of apparatus, however, the alternating electromotive force induced in the coil is affected by the change of magnetic flux threading the coil, or the revolution speed of the rotating body. When the rotating body is at a low speed, the coil induces only a small alternating e.m.f. so that the rotation of the rotating body can not be detected.

SUMMARY OF THE INVENTION

An object of the present invention is to provide a rotation detecting apparatus with the above drawback obviated, which comprises first and second plates opposed to each other, the first plate having equispaced, alternate input first and second electrodes arranged in the circumferential direction, the second plate having equispaced output electrodes arranged in the circumferential direction to oppose the first and second input electrodes of the second plate, whereby as one of the plates rotates, the first or second electrodes of the first plate come to oppose the output electrodes of the second plate, at which time either of pulse voltages (or alternating voltages) of opposite phase applied to the first and second electrodes is transmitted to the output electrodes of the second plate, resulting in satisfactory detection of rotation of the rotating body.

Another object of the present invention is to provide a rotation detecting apparatus comprising a first plate fastened to its stationary side, a second plate having a ring-shaped output electrode and which is likewise fastened to the stationary side, and a metal plate having projections provided to oppose the first and second input electrodes of the first plate and which is rotatably interposed between the first and second plates, whereby the rotation of the metal plate can be detected at the output electrode without requiring the signal transmission between the rotating and stationary sides, thus permitting satisfactory detection of rotation of a rotating body.

Other objects, features and advantages of this invention will become apparent from the following description taken in conjunction with the accompanying drawings.

BRIEF DESCRIPTION OF THE DRAWINGS

FIGS. 1A and 1B are cross and longitudinal sections showing a main part of a first embodiment of a rotation detecting apparatus according to the present invention.

FIGS. 4A and 4B are electrical circuit diagrams showing the positional relation between the electrodes at a time when the rotating body rotates, which diagrams are useful for explaining the operation of the apparatus of FIG. 1.

FIG. 8 is an electrical connection diagram of one embodiment of the detector section as shown in FIG. 6.

FIGS. 9A and 9B are electrical circuit diagrams showing the positional relation between the electrodes at a time when the rotating body rotates, which diagrams are useful for explaining the operation of the apparatus of FIG. 6.

FIG. 10 shows signal waveforms of respective points, to which reference is made in explaining the operation of the second embodiment.

FIGS. 13A to 13B are electrical circuit diagrams showing the positional relation between electrodes at a time when the rotating body rotates, which diagrams are useful for explaining the operation of the third embodiment.

DESCRIPTION OF THE PREFERRED EMBODIMENTS

Figure 2A:
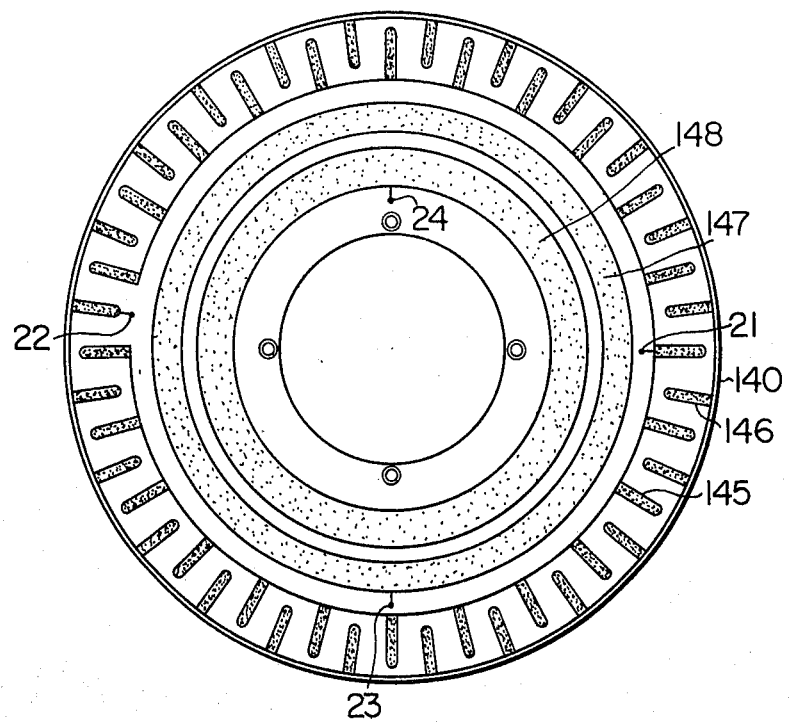
FIGS. 2A and 2B are front views of first and second plates as shown in FIGS. 1A and 1B.

Some embodiments of the present invention will now be mentioned with reference to the drawings. A first embodiment of the invention will first be described with reference to FIGS. 1 to 5.

Referring to FIG. 1, reference numeral 100 represents a housing which is fastened to the outside of a bearing 110 and is supported securely by, for example, an engine body (not shown), and 120 a shaft fastened on the inside of the bearing 110 and which is connected to, for example, the crankshaft of an engine. Thus, when the shaft 120 rotates, a rotating member 160 which is fastened to the shaft 120 with screws 190 is rotated with respect to the housing 100. To the rotating member 160 is secured with screws 180 a second disk plate 150 formed of a printed board on which electrodes are formed by printing, which disk plate being rotated by the revolution of the rotating member 160. Moreover, a first disk plate 140 formed of a printed board on which electrodes are printed is fastened to the housing 100 with screws 170 to make a small gap with the second plate 150, and connected with signal lines 141, 142, 143 and 144 from a detector section 101 which is mounted on a printed board 130 that is secured to the housing 100.

FIG. 2A shows a side 140a of the first plate 140, opposing to the second plate 150. The signal lines 141, 142, 143 and 144 are connected through junctions 21, 22, 23 and 24 to first toothed electrodes 145, second toothed electrodes 146, a third circular electrode 147 and a fourth circular electrode 148, respectively. The first and second toothed electrodes 145 and 146 are arranged so that the plurality of equispaced radial teeth are alternately interdigitated with each other along the circumferential direction. The first, second, third and fourth electrodes 145, 146, 147 and 148 are electrically insulated from one another.

Figure 2B:
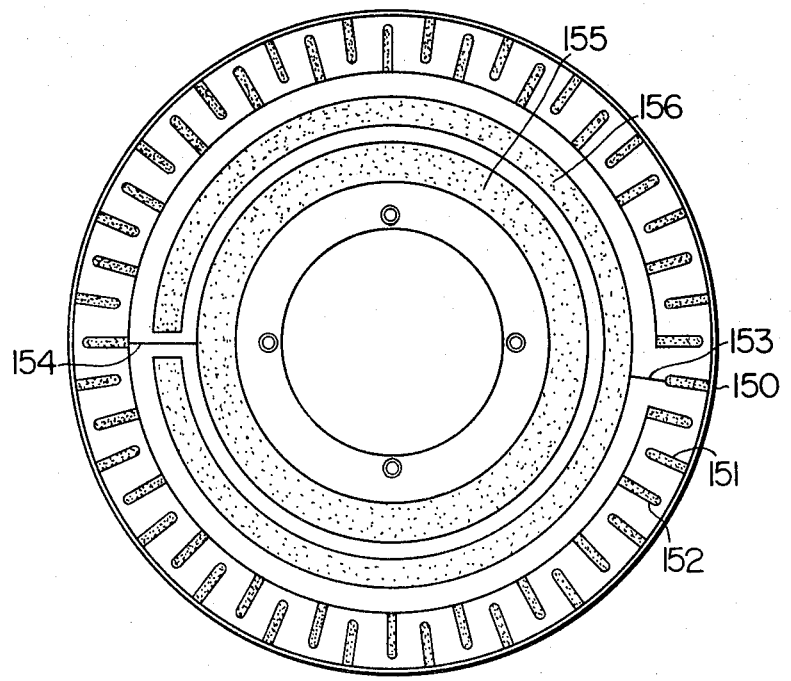

FIG. 2B shows a side 150a of the second plate 150, opposing to the first plate 140. First toothed electrodes 151 are connected to a third circular electrode 156 by a lead wire 153, and second toothed electrodes 152 to a fourth circular electrode 155 by a lead wire 154. The first and second electrodes 151 and 152 are disposed so that their plurality of equispaced radial teeth are alternately interdigitated with each other along the circumferential direction. The first and third electrodes 151 and 156 are electrically insulated from the second and third electrodes 152 and 155. The plates 140 and 150 are concentric with a rotating member, for example, the crankshaft of an engine, and printed thereon with the electrodes so that the electrodes 146, 145, 147 and 148 are opposed to electrodes 151, 152, 156 and 155, respectively.

Figure 3:
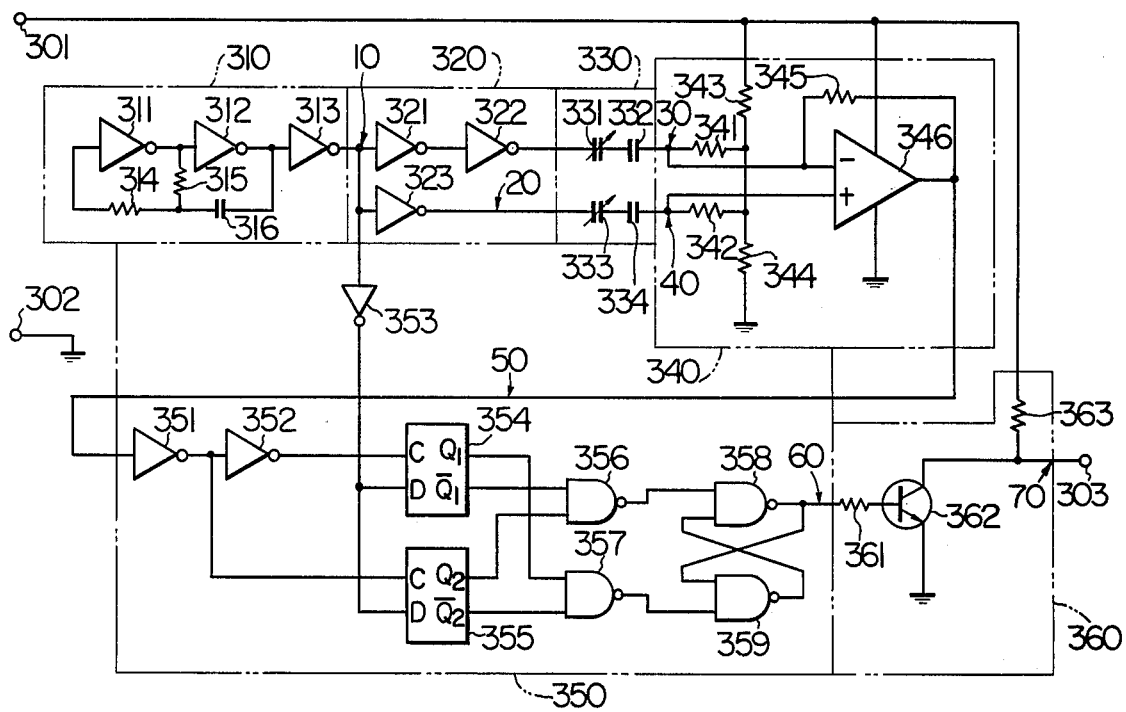
FIG. 3 is an electrical connection diagram of one embodiment of the detector section of FIG. 1.
Figure 5:
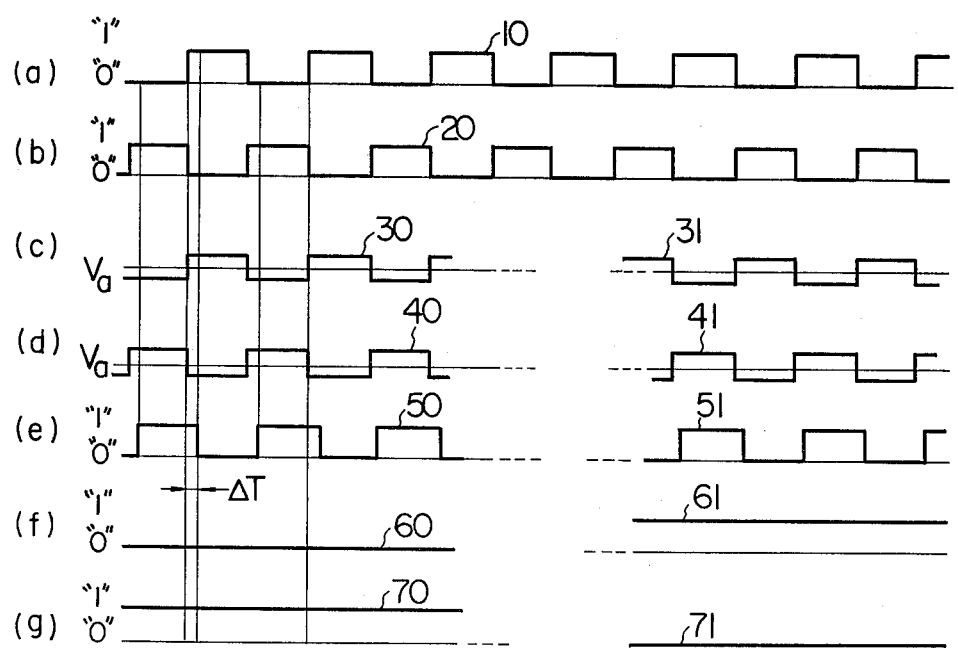
FIG. 5 shows signal waveforms of respective points, to which reference is made in explaining the operation of the first embodiment.

FIG. 3 is an electrical circuit diagram of the detector circuit section 101. Referring to FIG. 3, there are shown a power supply terminal 301 to which a constant voltage $V_c$ is applied, and a terminal 302 which is grounded. Shown at 310 is a known CR oscillator, 320 a reference signal generator, 330 a detector having the upper electrodes 151, 152, 156 and 155 and the lower electrodes 146, 145, 147 and 148, 340 a comparator, 350 a phase detector, 360 an output circuit, and 303 an output terminal.

The operation of the above-mentioned arrangement will next be described. As shown in FIG. 3, the CR oscillator 310 consists of inverter gates 311, 312, and 313, resistors 314 and 315 and a capacitor 316 and produces an oscillation waveform 10 as shown by FIG. 5(a). This oscillation waveform 10 is transmitted to the reference signal generator 320, which then produces a signal equal in phase to the oscillation waveform 10 and a signal 20 opposite in phase thereto as shown by FIG. 5(b).

As shown in FIG. 4A, when the shaft 120 (as illustrated in FIG. 1) rotates, the second plate 150 rotates along therewith so that its first electrode 151 opposes the first electrode 145 of the first plate 140 and that the second electrode 152 of the second plate 150 opposes the second electrode 146 of the first plate 140. At this time, when the signal in phase with the oscillation waveform 10 is applied through the signal line 141 to the first electrode 145 of the first plate 140, the oscillation waveform 10 is passed through a capacitor (as represented by 331 in FIG. 3) formed by the electrode 145 of the first plate 140 and the first electrode 151 of the second plate 150 and appears at the lead wire 153 as shown in FIG. 2B. Then, this signal in phase with the signal 10 is transmitted through a capacitor (represented by 332 in FIG. 3) formed by the third electrode 156 of the second plate 150 and the third electrode 147 of the first plate 140, and through the junction 23 to the comparator 340 as a signal 30 shown by FIG. 5(c). Similarly, the signal 20 transmitted through the signal line 142 to the second electrode 146 of the first plate 140 is applied through a capacitor (shown at 333 in FIG. 3) formed by the second electrode 146 and the second electrode 152 of the second plate 150 to the second electrode 152 of the second plate 150 as a signal in phase with the signal 20. Then, this signal is fed through a capacitor (shown at 334 in FIG. 3) formed by the fourth electrode 155 of the second plate 150 and the fourth electrode 148 of the first plate 140, and through the junction 24 to the comparator 340 as a signal 40 shown by FIG. 5(d). However, the signals 30 and 40 take the waveform with a reference potential $V_a$ shown by FIGS. 5(c) and (d) and which is determined by resistors 343 and 344 of the comparator 340. These signals 30 and 40 are amplified by a differential amplifier which is formed of a resistor 345 and an operational amplifier (hereinafter referred to simply as OP amp) 346 in the comparator 340. Thus, this differential amplifier produces a signal 50 which is as shown by FIG. 5(e) delayed time $\Delta T$ with respect to the oscillation waveform 10, where $\Delta T$ is the delay time in the capacitor response and the switching of the OP amp.

The signal 50 is shaped in waveform by inverter gates 351 and 352 of the phase detector 350. Thus, to the clock terminal of a D-type flip-flop 354 is applied a signal in phase with the signal 50, and to the clock terminal of a D-type flip-flop 355 a signal opposite in phase to the signal 50. The signal opposite in phase to the oscillation waveform 10 is applied from the CR oscillator 310 through an inverter gate 353 to the data terminals of the D-type flip-flops 354 and 355. Consequently, the D-type flip-flop 354 takes "1" state at the output terminals $Q_1$ and the D-type flip-flop 355 takes "0" state at the output terminal $Q_2$. Then, the succeeding stage of NAND gates 356, 357, 358 and 359 thus supplies "0" signal 60 shown by FIG. 5(f) to a signal line 60. This signal is applied to the output circuit 360 in which it is fed through a resistor 361 to a transistor 362, which is thus caused to turn off. As a result, at the output terminal 303 there appears a signal "1" (a signal 70 shown by FIG. 5(g)) indicating that the first electrode 151 of the second plate 150 opposes the first electrode 145 of the first plate 140 (or the second electrode 152 of the second plate 150 opposes the second electrode 146 of the first plate 140).

Moreover, as shown in FIG. 4B, when the first electrode 151 of the second plate 150 comes to be opposite to the second electrode 146 of the first plate 140 and the second electrode 152 of the second plate 150 to the first electrode 145 of the first plate 140, the signal in phase with the signal 20 appears at the first electrode 151 of the second plate 150. Then, to the third electrode 147 of the first plate 140 is applied a signal 31 with the reference potential of $V_a$ as shown by FIG. 5(c). In addition, the signal in phase with the oscillation waveform 10 appears at the second electrode 152 of the second plate 150, and then to the fourth electrode 148 of the first plate 140 is applied a signal 41 with the reference potential of $V_a$ as shown by FIG. 5(d). At this time, to the output terminal of the comparator 340 is applied a signal 51 as shown by FIG. 5(e), and thus at the output terminal of the phase detector 350 there appears a signal 61 as shown by FIG. 5(f). Consequently, to the output terminal 303 is applied a signal "0" (a signal 71 as shown by FIG. 5(g)) indicating that the first electrode 151 of the second plate 150 is opposite to the second electrode 146 of the first plate 140.

Thus, when the first and second electrodes 151 and 152 provided on the second plate 150 are passed above the first and second electrodes 145 and 146 provided on the first plate 140 as the shaft 120 rotates, signals of "1" and "0" alternately appear at the output terminal 303, thereby enabling detection of the rotation of the second plate 150, or the shaft 120.

In this first embodiment, the signals appearing at the first and second electrodes 151 and 152 of the second plate 150 are compared by the comparator 340, and thus a large output is produced therefrom in accordance with the difference between the signals at the first and second electrodes 151 and 152, thereby assuring detection of the rotation.

While in the above first embodiment the signal in phase with the oscillation waveform 10 is applied through the signal line 141 and through the junction 21 to the first electrode 145 of the first plate 140 and the signal 20 opposite in phase to the oscillation waveform 10 is applied through the signal line 142 and through the junction 22 to the second electrode 146 of the first plate 140, the signal in phase with the oscillation waveform 10 may be applied through the junction 23 (or 24) to the third electrode 147 of the first plate 140 (or the fourth electrode 148 of the first plate 140) and the signal 20 may be applied through the junction 24 (or 23) to the fourth electrode 148 of the first plate 140 (or the third electrode 147 of the first plate 140), both the transmitted signals being respectively applied through the junctions 21 and 22 to the comparator 340.

Figure 6A:
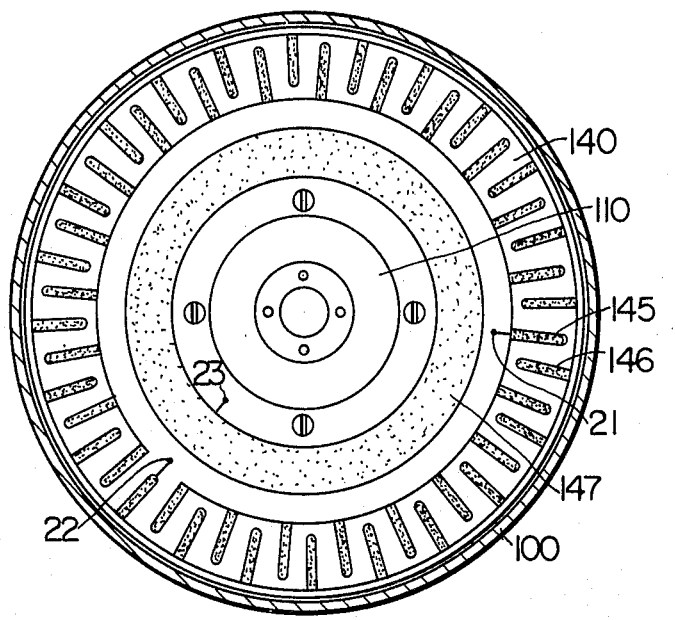
FIGS. 6A and 6B are front and longitudinal sections of a main part of a second embodiment of the apparatus according to the invention.
Figure 6B:
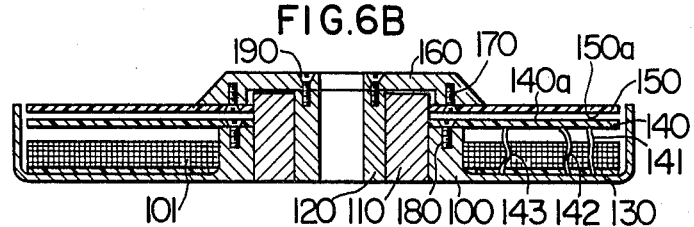
Figure 7:
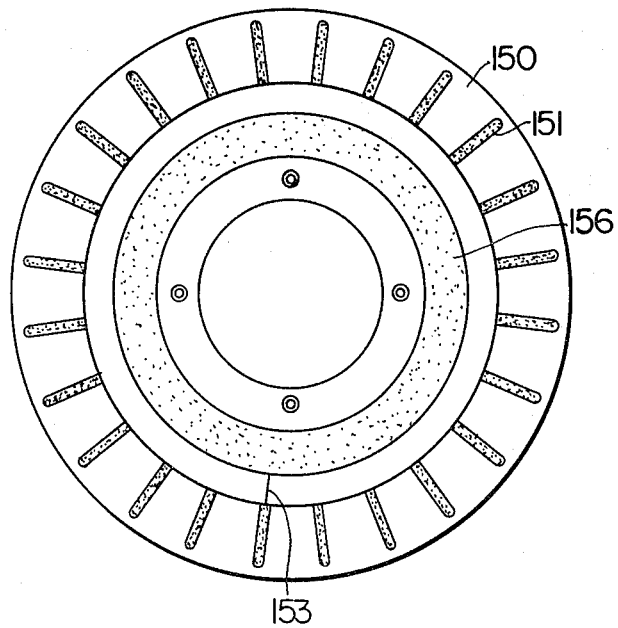
FIG. 7 is a front view showing the second plate as shown in FIG. 6.

FIGS. 6 to 10 show a second embodiment of the present invention. Unlike the first embodiment, only the first electrode 151 is provided as an output electrode on the second plate 150 as shown in FIG. 7 and the electrodes 147 and 156 are respectively provided on the first and second plates 140 and 150 to form only one capacitor so that signals can be transmitted from the second rotating plate 150 to the first stationary plate 140. In this case, to the detector 330 is fed from the first electrode 151 the output signal alone, which is then applied to the operational amplifier 346 where it is compared with a signal of a level predetermined by the resistors 343 and 344.

In accordance with the second embodiment according to the present invention, the oscillator 310 consisting of the inverter gates 311, 312 and 313, the resistors 314 and 315 and the capacitor 316, supplies to the signal line 10 the oscillation waveform 10 as shown by FIG. 10(a). This oscillation waveform 10 is waveform-shaped into an in-phase signal through the inverter gates 321 and 322 of the reference signal output circuit 320 and into an opposite-phase signal (the signal 20 shown by FIG. 10(b)) through the inverter gate 323 thereof. These signals are then applied to the detector 330. When the electrodes 145 and 151 become opposed to each other by rotation of the shaft 120 as shown in FIG. 9A, the pulse voltages 10 and 20 of opposite phase as shown by FIGS. 10(a) and 10(b), which are applied to the electrodes 145 and 146, appear at the electrode 151 with their phases unchanged. The pulse voltage applied to the electrode 145 is transmitted through the capacitor (shown at 332 in FIG. 8) formed of the electrodes 156 and 147 to the signal line 30 on which the signal 30 shown by FIG. 5(c) appears. This signal 30 has a reference potential of $V_a$ (as shown by FIG. 10(c)) determined by the resistors 343 and 344 of the comparator 340. Then, the signal 30 is fed to the differential amplifier circuit formed of the operational amplifier 346 and the resistor 345 in the comparator 340, so that the signal 30 is compared with the voltage $V_a$ which is determined by the resistors 343 and 344. Consequently, on the signal line 40 there appears the signal 40 delayed $\Delta T$ as shown by FIG. 10(d), where $\Delta T$ is the delay time of the capacitor response time and the switching time of the OP amp 346. The signal 40 is waveform-shaped by the inverter gates 351 and 352 of the phase detector 350 with the result that the pulse voltage in phase with the signal 40 is applied to the clock terminal of the D-type flip-flop 354 and that the pulse voltage with opposite phase to the signal 40 is applied to the clock terminal of the D-type flip-flop 355. Moreover, to the data terminals of the D-type flip-flops 354 and 355 is applied through the inverter gate 353 from the CR oscillator 310 the signal (in phase with the signal 20) opposite in phase to the oscillation wavefrom 10. As a result, the D-type flip-flop 354 produces "1" signal at the output terminal $Q_1$ and the D-type flip-flop 355 produces "0" signal at the output terminal $Q_2$. Subsequently, the combination of the NAND gates 356, 357, 358 and 359 causes the "0" signal (shown at 50 in FIG. 10(e)) to be produced on the signal line 50. This "0" signal is applied through the resistor 361 of the output circuit 360 to the transistor 362 thereof, thus making the transistor 362 nonconducting. Therefore, the "1" signal appears on the signal line 60 as shown by FIG. 10(f) at 60.

When the electrode 146 comes to oppose the electrode 151 by the rotation of the shaft 120 as shown by FIG. 9(b), the signal 31 in phase with the signal 20, as shown by FIG. 10(c) appears on the signal line 30. Then, as is similar to the above description, the operational amplifier 346 produces a signal 41 shown by FIG. 10(d) and supplies it to the phase detector 350, which thus produces at its output terminal the "1" signal 51 shown by FIG. 10(e). Consequently, the "0" signal 61 shown by FIG. 10(f) at 61 appears on the signal line 60. In this way, when the second plate 150 is rotated by the rotation of the shaft 120 and the first electrode 151 of the second plate 150 comes to oppose the first electrode 145 of the first plate 140, the "1" signal is applied to the output terminal 303, whilst when the first electrode 151 of the second plate 150 comes to oppose the second electrode 146 of the first plate 140, the "0" signal is applied to the output terminal 303, thus the rotating member being detected in rotation.

Figure 11A:
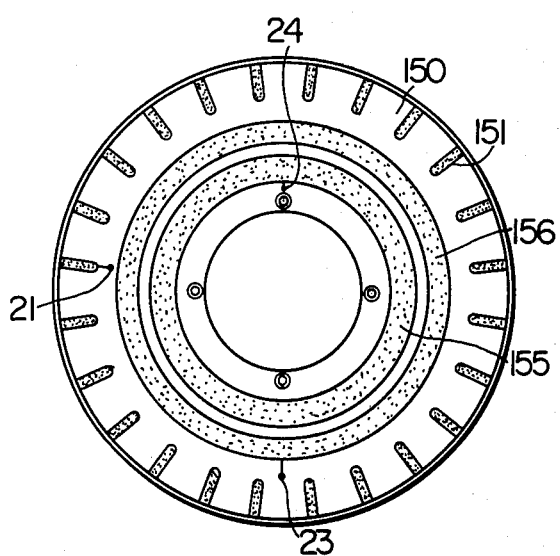
FIGS. 11A and 11B are front views of another embodiment of second and first plates used in the apparatus shown in FIG. 6.
Figure 11B:
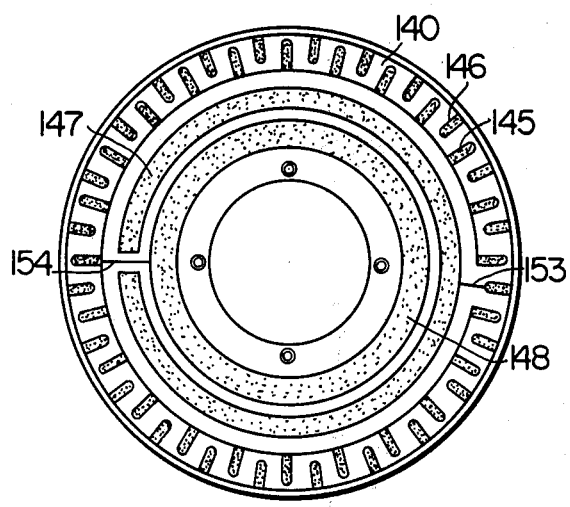

While in the second embodiment the first plate 140 as shown in FIG. 6A is fastened to the housing 100 and the second plate 150 as shown in FIG. 7 is rotated along with the shaft 120, the first plate 140 shown in FIG. 11B may be fastened to the rotating member 160 so as to rotate with the shaft 120 and the second plate 150 shown in FIG. 11A may be fastened to the housing 100, for effecting detection of rotation. In this case, the signal 10 shown by FIG. 10(a) and the signal 20 shown by FIG. 10(b) are applied through the junctions 23 and 24 shown in FIG. 11 to the electrodes 156 and 155 of the second plate 150. These signals are further applied to the first plate 140 through the capacitor formed of the electrode 156 of the second plate 150 and the third electrode 147 of the first plate 140, and through the capacitor formed of the electrode 155 of the second plate 150 and the fourth electrode 148 of the first plate 140. The signals from the first plate 140 are applied through the lead wires 153 and 154 to the second electrode 146 and the first electrode 145 of the first plate 140. The rotation of the first plate 140 is detected by the first electrode 151 of the second plate 150, and the detection signal is fed through the junction 21 to the comparator 340.

Figure 12A:
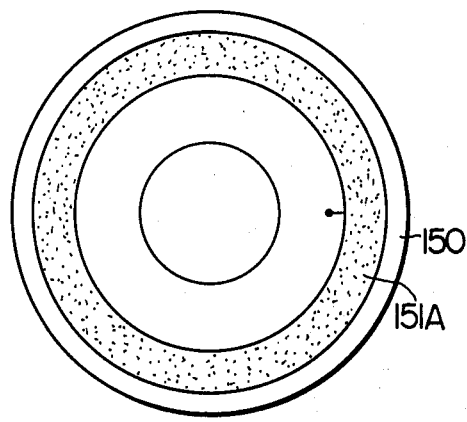
FIGS. 12A to 12C are front views of the second plate, metal plate and first plate in a third embodiment of the apparatus according to the present invention.
Figure 12B:
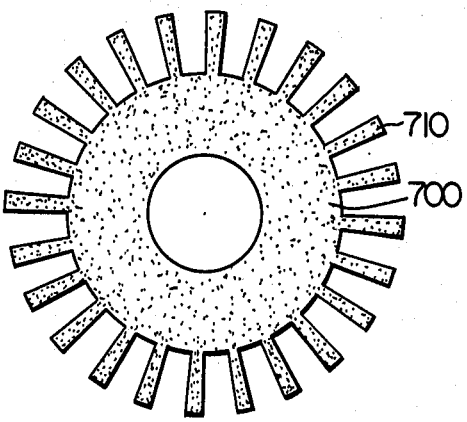
Figure 12C:
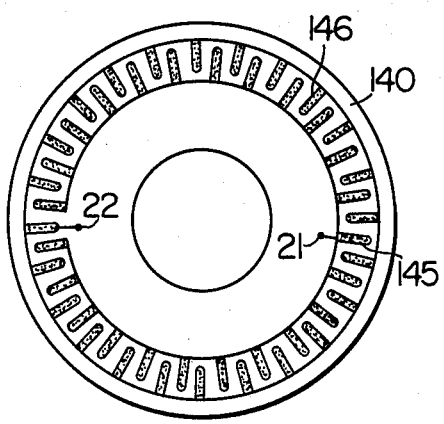

While in the first and second embodiments the two plates 140 and 150 are opposed to each other and one of the plates 140 and 150 is rotated for detection of the rotation, a third embodiment as shown in FIG. 12 can be used. That is, the second plate 150 and the first plate 140 are opposed to each other and both the plates 150 and 140 are fastened to the housing 100. Moreover, a metal plate 700 in the form shown in FIG. 12B is inserted between the plates 150 and 140 to oppose both the plates and this metal plate 700 is rotated along with the rotating member 160, at which time detection is made on the signal appearing at a ring-shaped electrode 151A of the second plate 150. In this case, the metal plate 700 inverted between the plates 150 and 140 has radially projecting teeth 710 which oppose the first and second electrodes 145 and 146 of the first plate 140, and this metal plate 700 may be either grounded or ungrounded.

The grounded case will first be described with reference to FIG. 13. When the projecting teeth 710 of the metal plate 700 are interposed between the electrodes 145 and 151A which constitute a capacitor as shown in FIG. 13A, the value of the capacitance formed by the electrodes 145 and 151A becomes larger than that of the capacitance formed of the electrodes 146 and 151A. Therefore, when pulse signals of opposite phase are applied to the electrodes 145 and 146, the signal in phase with the signal applied to the electrode 145 appears at the electrode 151A. Likewise, the projecting teeth 710 are interposed between the electrodes 146 and 151A which form a capacitor as shown in FIG. 13B, the signal in phase with the signal applied to the electrode 146 appears at the electrode 151A. Next, let it be considered that the metal plate 700 is grounded. When the condition as shown in FIG. 13A is brought about, the value of the capacitance formed of the electrodes 146 and 151A becomes larger, permitting the signal in phase with the signal applied to the electrode 146 to be applied to the electrode 151A. When the condition as shown in FIG. 13B is brought about, the signal in phase with the signal applied to the electrode 145 is applied to the electrode 151A. The signal at the electrode 151A is then transmitted to the comparator 340 as shown in FIG. 8. As the metal plate 700 is rotated, signal "1" or "0" appears at the output terminal 303 as shown in FIG. 8, thus leading to the detection of rotation of the metal plate 700.

While in the above embodiments pulse voltages are applied to the first and second electrodes 145 and 146 of the first plate 140, a sawtooth wave voltage or other formes of alternating voltages may be applied thereto.

Moreover, although in the first and second embodiments the capacitor coupling is used for the transmission of signal between the rotating and stationary sides, other types of contactless signal transmission means or a contact-type signal transmission means using brush and slip ring may be employed.

We claim:

1. An apparatus for detecting the rotation of a rotating member comprising:
    a stationary disk plate supported in a stationary relation to said rotating member and provided with a first and second toothed electrodes electrically insulated from each other and a first and second circular electrodes electrically insulated from each other, said first and second toothed electrodes having a plurality of equispaced radial teeth respectively and arranged alternately and continuously, and said first and second circular electrodes being insulated electrically from said first and second toothed electrodes;
    a rotatable disk plate rotated by said rotating member and provided with a third and fourth toothed electrodes insulated electrically from each other and a third and fourth circular electrodes insulated electrically from each other, said third and fourth toothed electrodes having a plurality of equispaced radial teeth respectively and arranged alternately, said third and fourth circular electrodes being electrically connected to said third and fourth toothed electrodes respectively, and said third and fourth toothed electrodes and said third and fourth circular electrodes being arranged to face said first and second toothed electrodes and said first and second circular electrodes of said stationary disk plate with a spacing respectively;
    input circuit means including an oscillator for supplying said first and second toothed electrodes of said stationary disk plate with a first and second periodic rectangular signals respectively which are opposite in phase and same in frequency with each other; and
    output circuit means including a comparator for receiving output rectangular signals produced from said first and second circular electrodes of said stationary disk plate and a phase detector circuit responsive to the comparator output and the oscillator output to derive a rotation signal at every predetermined angular rotation of said rotating member.

2. An apparatus for detecting the rotation of a rotating member comprising:
    a stationary disk plate supported in a stationary relation to said rotating member and provided with a first and second toothed electrodes electrically insulated from each other and a first and second circular electrodes electrically insulated from each other, said first and second toothed electrodes having a plurality of equispaced radial teeth respectively and arranged alternately and continuously, and said first and second circular electrodes being insulated electrically from said first and second toothed electrodes;
    a rotatable disk plate rotated by said rotating member and provided with a third and fourth toothed electrodes insulated electrically from each other and a third and fourth circular electrodes insulated electrically from each other, said third and fourth toothed electrodes having a plurality of equispaced radial teeth respectively and arranged alternately, said third and fourth circular electrodes being electrically connected to said third and fourth toothed electrodes respectively, and said third and fourth toothed electrodes and said third and fourth circular electrodes being arranged to face said first and second toothed electrodes and said first and second circular electrodes of said stationary disk plate with a spacing respectively;
    input circuit means including an oscillator for supplying said first and second circular electrodes of said stationary disk plate with a first and second periodic rectangular signals respectively which are opposite in phase and same in frequency with each other; and output circuit means including a comparator for receiving output rectangular signals produced from said first and second electrodes of said stationary disk plate and a phase detector circuit responsive to the comparator output and the oscillator output to derive a rotation signal at every predetermined angular rotation of said rotating member.

* * * * *